(12) United States Patent
Chen et al.

(10) Patent No.: US 10,678,104 B2
(45) Date of Patent: Jun. 9, 2020

(54) DISPLAY PANEL WITH FLEXIBLE CIRCUIT BOARD REGIONS AND DISPLAY MODULE

(71) Applicant: Wuhan China Star Optoelectronics Technology Co., Ltd., Wuhan (CN)

(72) Inventors: Bocai Chen, Wuhan (CN); Jinglong Wang, Wuhan (CN)

(73) Assignee: Wuhan China Star Optoelectronics Technology Co., Ltd., Wuhan (CN)

( * ) Notice: Subject to any disclaimer, the term of this patent is extended or adjusted under 35 U.S.C. 154(b) by 0 days.

(21) Appl. No.: 16/309,456

(22) PCT Filed: Nov. 22, 2018

(86) PCT No.: PCT/CN2018/117030
§ 371 (c)(1),
(2) Date: Dec. 13, 2018

(87) PCT Pub. No.: WO2020/062517
PCT Pub. Date: Apr. 2, 2020

(65) Prior Publication Data
US 2020/0103693 A1   Apr. 2, 2020

(30) Foreign Application Priority Data
Sep. 27, 2018   (CN) .......................... 2018 1 1133411

(51) Int. Cl.
G02F 1/1345   (2006.01)
G02F 1/13     (2006.01)

(52) U.S. Cl.
CPC ...... G02F 1/13458 (2013.01); G02F 1/13452 (2013.01); G02F 1/1309 (2013.01)

(58) Field of Classification Search
CPC .... G02F 1/3458; G02F 1/3452; G02F 2/1309; G02F 1/1345; G02F 1/13
USPC .......................................................... 257/48
See application file for complete search history.

(56) References Cited

U.S. PATENT DOCUMENTS

| | | | | |
|---|---|---|---|---|
| 5,481,432 A * | 1/1996 | Tsukada | .................... | G06F 1/16 361/679.33 |
| 5,528,403 A * | 6/1996 | Kawaguchi | ......... | G02F 1/13452 349/149 |
| 5,737,272 A * | 4/1998 | Uchiyama | ........... | G02F 1/13452 345/206 |
| 6,020,867 A * | 2/2000 | Shimada | ........... | G02F 1/133382 345/87 |
| 6,151,005 A * | 11/2000 | Takita | .................. | G09G 3/2011 345/89 |
| 9,140,667 B2 * | 9/2015 | Novotny | ................ | B82Y 15/00 |
| 2002/0027634 A1 * | 3/2002 | Kang | .................. | G02F 1/13452 349/150 |
| 2009/0147204 A1 * | 6/2009 | Kang | .................. | G02F 1/13452 349/150 |

(Continued)

Primary Examiner — Alexander O Williams (57) ABSTRACT

A display panel and a display module are provided. The display panel includes a bonding region. The bonding region includes a drive integrated circuit (IC) chip region, a first flexible circuit board region and a second flexible circuit board region. A first soldering pad is disposed in the first flexible circuit board region. A second soldering pad is disposed in the second flexible circuit board region. The first soldering pad and the second soldering pad are configured to output driving signals.

16 Claims, 3 Drawing Sheets

(56) References Cited

U.S. PATENT DOCUMENTS

2013/0248862 A1* 9/2013 Inoue ................. H01L 31/0224
                                                    257/48
2018/0069067 A1* 3/2018 Oh ..................... H01L 27/3262
2018/0254226 A1* 9/2018 Iguchi ................... H01L 22/14

* cited by examiner

DISPLAY PANEL WITH FLEXIBLE CIRCUIT BOARD REGIONS AND DISPLAY MODULE

RELATED APPLICATIONS

This application is a National Phase of PCT Patent Application No. PCT/CN2018/117030 having International filing date of Nov. 22, 2018, which claims the benefit of priority of Chinese Patent Application No. 201811133411.2 filed on Sep. 27, 2018. The contents of the above applications are all incorporated by reference as if fully set forth herein in their entirety.

FIELD AND BACKGROUND OF THE INVENTION

The present invention relates to fields of displays, especially to a display panel and a display module.

A conventional display panel bonding region includes a drive integrated circuit (IC) chip region, a flexible circuit board region, and a liquid crystal cell test region. The drive IC chip region is configured to bond with an IC chip which is used for driving internal circuit and thin film transistors (TFTs). The flexible circuit board region is configured to bond with a flexible circuit board (FPC) which is used for connecting with a mainboard of the electronic device. The liquid crystal cell test region is used for sending signals, via cell test pads, to test display effectiveness of the display panel after the product has been processed to be a cell. Such test is conducted before the IC chip is bonded to the drive IC chip region.

Flexible circuit board soldering pads are disposed in the flexible circuit board region, and adjacent two of the flexible circuit board soldering pads have a smaller interval such that requirement to precision of alignment and connection of the flexible circuit board region and the flexible circuit board is higher, which easily results in alignment abnormality and thus abnormality of signal transmission of the display panel, which affects quality of the display panel.

SUMMARY OF THE INVENTION

The present invention provides a display panel and a display module, to solve the technical issue that alignment and connection of the flexible circuit board region and the flexible circuit board in the conventional display panel are abnormal.

To solve the above technical issue, the present invention provides technical solutions as follows.

The present invention provides a display panel, the display panel includes a bonding region, and the bonding region includes:

a drive integrated circuit (IC) chip region, wherein a drive IC chip is disposed in the drive IC chip region of the display panel, and the drive IC chip region is configured to output driving signals;

a first flexible circuit board region, wherein a first soldering pad is disposed in the first flexible circuit board region of the display panel, and the first soldering pad is electrically connected to an input terminal port of the drive IC chip region, and is electrically connected to a corresponding output terminal port of the drive IC chip region through internal wires of the drive IC chip to output first driving signals; and a second flexible circuit board region, wherein a second soldering pad is disposed in the second flexible circuit board region of the display panel, and the second soldering pad is configured to output second driving signals.

In the display panel of the present invention, the second soldering pad is further configured to transmit testing signals.

In the display panel of the present invention, the display panel further includes an array wiring area, and the second soldering pad is electrically connected to corresponding signal wires in the array wiring area to output the second driving signals.

In the display panel of the present invention, the drive IC chip region includes at least one input terminal port, and the first soldering pad includes at least one first sub-soldering pad; and a number of the at least one input terminal port is equal to or greater than a number of the at least one first sub-soldering pad.

In the display panel of the present invention, the second soldering pad is electrically connected to the corresponding input terminal port of the drive IC chip region, and is electrically connected to the corresponding output terminal port of the drive IC chip region through the internal wires of the drive IC chip to output the second driving signals.

In the display panel of the present invention, the drive IC chip region includes at least one first input terminal port and at least one second input terminal port, the first soldering pad include at least one first sub-soldering pad, and the second soldering pad include at least one second sub-soldering pad;

the at least one first sub-soldering pad is electrically connected to the at least one first input terminal port of the drive IC chip region, and is electrically connected to a first output terminal port corresponding to the at least one first input terminal port in the drive IC chip region through the internal wires of the drive IC chip to output the first driving signals; and the at least one second sub-soldering pad is electrically connected to the at least one second input terminal port of the drive IC chip region, and is electrically connected to a second output terminal port corresponding to the at least one second input terminal port in the drive IC chip region through the internal wires of the drive IC chip to output the second driving signals.

In the display panel of the present invention, a sum of a number of the at least one first input terminal port and a number of the at least one second input terminal port, is equal to or greater than a sum of a number of the at least one first sub-soldering pad and a number of the at least one second sub-soldering pad.

In the display panel of the present invention, the display panel includes two second flexible circuit board regions; and the drive IC chip region parallels the first flexible circuit board region, the second flexible circuit board regions are located at two outer sides of the drive IC chip region and the first flexible circuit board region respectively.

In the display panel of the present invention, the display panel further includes a liquid crystal cell test region, the liquid crystal cell test region includes at least one test soldering pad, and the at least one test soldering pad is configured to transmit testing signals.

The present invention also provides a display module. The display module includes a display panel, and further includes a touch layer, a polarizer and a cover plate layer located on the display panel. The display panel includes a bonding region, the bonding region includes:

a drive integrated circuit (IC) chip region, wherein a drive IC chip is disposed in the drive IC chip region of the display panel, and the drive IC chip region is configured to output driving signals;

a first flexible circuit board region, wherein a first soldering pad is disposed in the first flexible circuit board region of the display panel, and the first soldering pad is electrically connected to an input terminal port of the drive IC chip region, and is electrically connected to a corresponding output terminal port of the drive IC chip region through internal wires of the drive IC chip to output first driving signals; and a second flexible circuit board region, wherein a second soldering pad is disposed in the second flexible circuit board region of the display panel, and the second soldering pad is configured to output second driving signals.

In the display module of the present invention, the second soldering pad is further configured to transmit testing signals.

In the display module of the present invention, the display panel further includes an array wiring area, and the second soldering pad is electrically connected to corresponding signal wires in the array wiring area to output the second driving signals.

In the display module of the present invention, the drive IC chip region includes at least one input terminal port, and the first soldering pad includes at least one first sub-soldering pad; and a number of the at least one input terminal port is equal to or greater than a number of the at least one first sub-soldering pad.

In the display module of the present invention, the second soldering pad is electrically connected to the corresponding input terminal port of the drive IC chip region, and is electrically connected to the corresponding output terminal port of the drive IC chip region through the internal wires of the drive IC chip to output the second driving signals.

In the display module of the present invention, the drive IC chip region includes at least one first input terminal port and at least one second input terminal port, the first soldering pad includes at least one first sub-soldering pad, and the second soldering pad include at least one second sub-soldering pad;

the at least one first sub-soldering pad is electrically connected to the at least one first input terminal port of the drive IC chip region, and is electrically connected to a first output terminal port corresponding to the at least one first input terminal port in the drive IC chip region through the internal wires of the drive IC chip to output the first driving signals; and the at least one second sub-soldering pad is electrically connected to the at least one second input terminal port of the drive IC chip region, and is electrically connected to a second output terminal port corresponding to the at least one second input terminal port in the drive IC chip region through the internal wires of the drive IC chip to output the second driving signals.

In the display module of the present invention, a sum of a number of the at least one first input terminal port and a number of the at least one second input terminal port, is equal to or greater than a sum of a number of the at least one first sub-soldering pad and a number of the at least one second sub-soldering pad.

In the display module of the present invention, the display panel includes two second flexible circuit board regions; and the drive IC chip region parallels the first flexible circuit board region, the second flexible circuit board regions are located at two outer sides of the drive IC chip region and the first flexible circuit board region respectively.

In the display module of the present invention, the display panel further includes a liquid crystal cell test region, the liquid crystal cell test region includes at least one test soldering pad, and the at least one test soldering pad is configured to transmit testing signals.

Advantages: the present invention, by disposing the second flexible circuit board regions on the sides of the first flexible circuit board region, decreases the number of the first soldering pads in the first flexible circuit board region, increases the interval of the adjacent first soldering pads, which certainly reduces requirement to connection between the flexible circuit board region and the flexible circuit board and raises quality of the display panel.

BRIEF DESCRIPTION OF THE SEVERAL VIEWS OF THE DRAWINGS

To more clearly elaborate on the technical solutions of embodiments of the present invention or prior art, appended figures necessary for describing the embodiments of the present invention or prior art will be briefly introduced as follows. Apparently, the following appended figures are merely some embodiments of the present invention. A person of ordinary skill in the art may acquire other figures according to the appended figures without any creative effort.

DESCRIPTION OF SPECIFIC EMBODIMENTS OF THE INVENTION

Each of the following embodiments is described with appending figures to illustrate specific embodiments of the present invention that are applicable. The terminologies of direction mentioned in the present invention, such as "upper", "lower", "front", "rear", "left", "right", "inner", "outer", "side surface", etc., only refer to the directions of the appended figures. Therefore, the terminologies of direction are used for explanation and comprehension of the present invention, instead of limiting the present invention. In the figures, units with similar structures are marked with the same reference characters.

Figure 1:
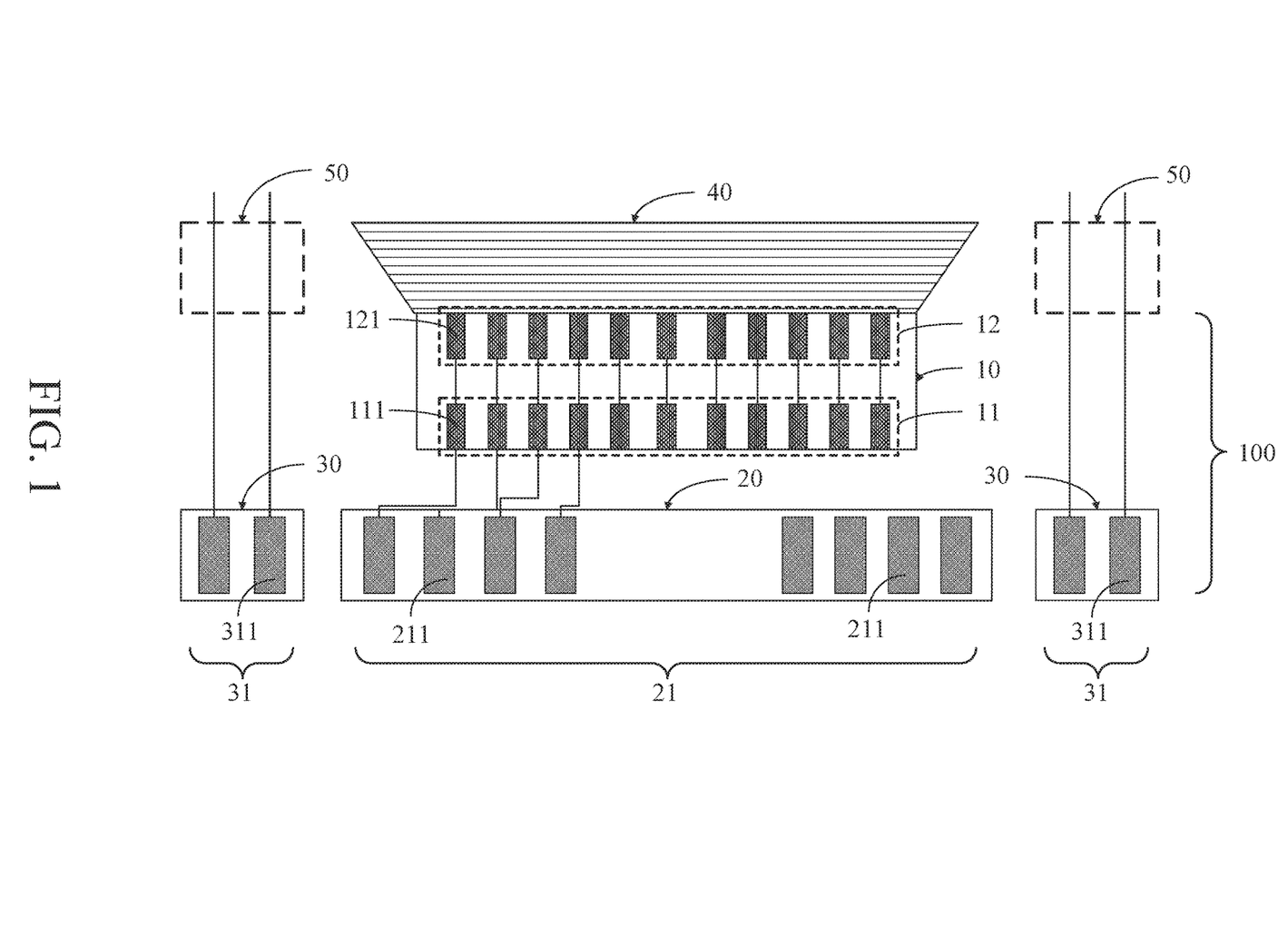
FIG. 1 is a schematic structural view of a first embodiment of a display panel of the present invention.

With reference to FIG. 1, FIG. 1 is a schematic structural view of a first embodiment of a display panel of the present invention.

The display panel includes a bonding region 100. The bonding region 100 includes a drive integrated circuit (IC) chip region 10, a first flexible circuit board region 20 and second flexible circuit board regions 30.

In an embodiment, the bonding region 100 includes two second flexible circuit board regions 30. The drive IC chip region 10 and the first flexible circuit board region 20 parallel each other. The second flexible circuit board regions 30 are located at two outer sides of the drive IC chip region 10 and the first flexible circuit board region 20, respectively.

A drive IC chip is disposed in the drive IC chip region 10 of the display panel. The drive IC chip region 10 is configured to output driving signals. The driving signals pass through fan out wires 40 between a displaying region and the bonding region of the display panel, and are transmitted to a scan region (gate on array, GOA) integrated on a substrate array to perform drive control to the liquid crystal display panel.

A first soldering pad 21 is disposed in the first flexible circuit board region 20 of the display panel. The first soldering pad 21 is electrically connected to an input terminal port 11 of the drive IC chip region 10, and is electrically connected to a corresponding output terminal port 12 of the drive IC chip region through internal wires of the drive IC chip to output first driving signals and perform drive control to the display panel.

A second soldering pad 31 is dispose in the second flexible circuit board region 30 of the display panel. The second soldering pad 31 is configured to output second driving signals to perform drive control to the display panel.

The display panel further includes array wiring area 50, the second soldering pad 31 is electrically connected to corresponding signal wires of the array wiring area 50 to output the second driving signals and perform drive control to the display panel.

The second soldering pad 31 includes at least one second sub-soldering pad 311. Each of the at least one second sub-soldering pad 311 is electrically connected to one of the array wiring area 50, by the signal wires in the array wiring area 50, transmits driving signals in the second soldering pad 31 directly into the GOA to perform drive control to the liquid crystal display panel.

In an embodiment, at least one first input terminal port 111 is disposed in the drive IC chip region 10. Each of the at least one first input terminal port 111 corresponds to a first output terminal port 121, the at least one first input terminal port 111 receives driving signals transmitted from a flexible circuit board, and outputs the driving signals through the first output terminal port 121 to perform drive control to the liquid crystal display panel.

The first soldering pad 21 includes at least one first sub-soldering pad 211. The at least one first sub-soldering pad 211 corresponds to the at least one first input terminal port 111. With reference to FIG. 1, the at least one first sub-soldering pad 211 is electrically connected to the at least one first input terminal port 111. The at least one first input terminal port 111 transmits driving signals to the first output terminal port 121 through the internal wires, and transmits drive signals to the GOA through one of the fan out wires 40 to perform drive control to the liquid crystal display panel.

A number of the at least one input terminal port 11 is equal to or greater than a number of the at least one first sub-soldering pad 211. In other words, a number of the at least one first input terminal port 111 in the drive IC chip can be greater than a number of the at least one first sub-soldering pad 211. The at least one input terminal port not electrically connected to the at least one first sub-soldering pad 211 can be configured to output other signals.

The second soldering pad 31 can be further configured to transmit testing signals. The testing signals are configured to perform a test to the display panel. With reference to FIG. 1, the at least one second sub-soldering pad 311 can either serve as an input terminal end for driving signals of the flexible circuit board or serve as an input terminal end for testing signals. The at least one second sub-soldering pad 311 transmits first testing signals, and the first testing signals is transmitted through the array wiring area 50 to an array test region (not shown) of the display panel to perform a test to the display panel.

Figure 2:
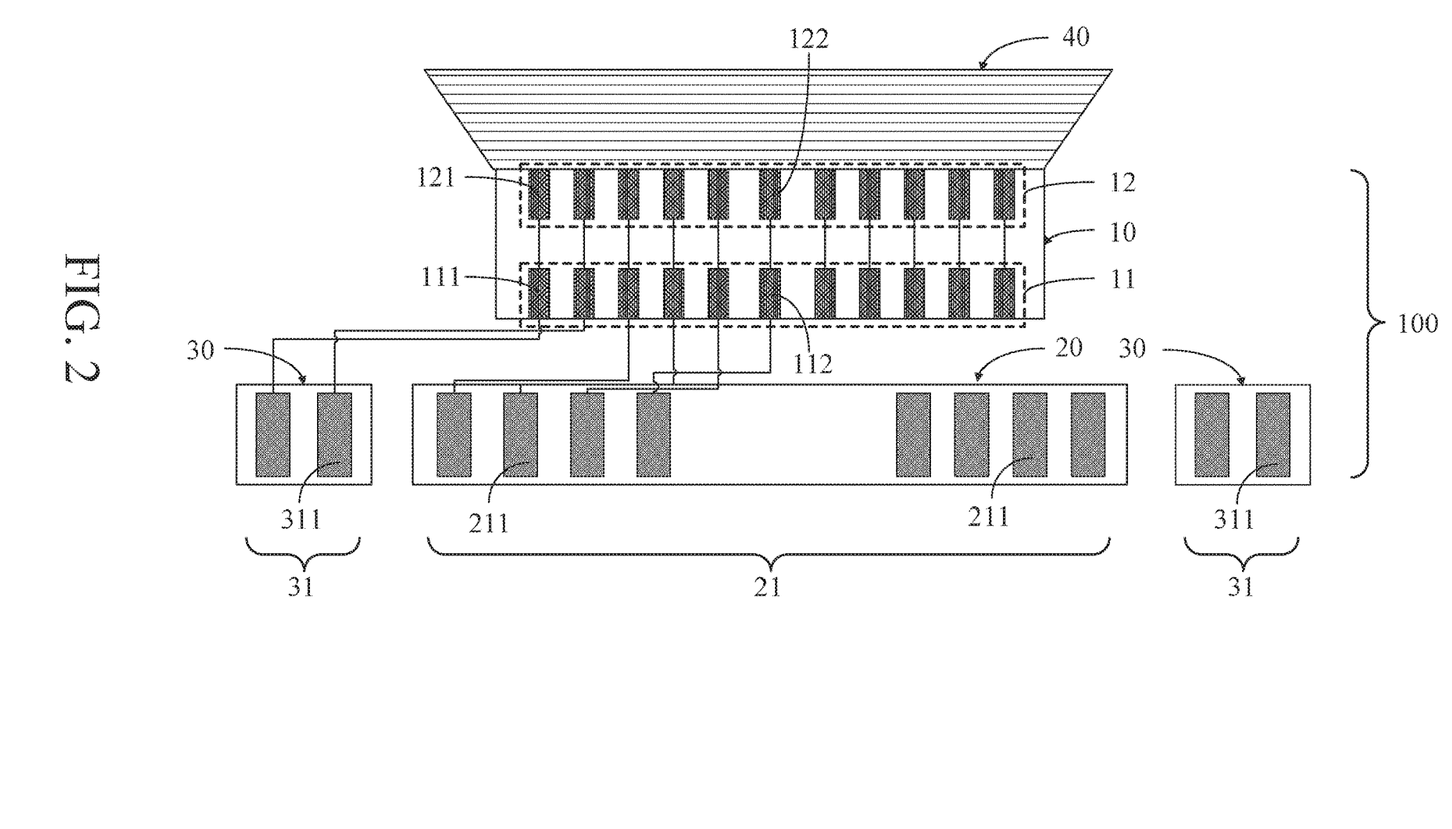
FIG. 2 is a schematic structural view of a second embodiment of the display panel of the present invention.

With reference to FIG. 2, FIG. 2 is a schematic structural view of a second embodiment of the display panel of the present invention.

In an embodiment, the second soldering pad 31 is electrically connected to an input terminal port 11 of the drive IC chip region 10, and is electrically connected to a corresponding output terminal port 12 of the drive IC chip region 10 through the internal wires of the drive IC chip to output the second driving signals and perform drive control to the display panel.

In an embodiment, the drive IC chip region 10 includes at least one first input terminal port 111 and at least one second input terminal port 112, the first soldering pad 21 includes at least one first sub-soldering pad 211, the second soldering pad 31 includes at least one second sub-soldering pad 311.

With reference to FIG. 2, the at least one first sub-soldering pad 211 is electrically connected to the at least one first input terminal port 111 of the drive IC chip region 10, and is electrically connected to a first output terminal port 121 corresponding to the at least one first input terminal port 111 of the drive IC chip region 10 through the internal wires of the drive IC chip to output the first driving signals and perform drive control to the display panel.

In an embodiment, the flexible circuit board outputs first driving signals through the at least one first sub-soldering pad 211. The first driving signals enter the drive IC chip through the at least one first input terminal port 111. Finally, the first driving signals are outputted out from the first output terminal port 121 through the internal wires of the drive IC chip, and are transmitted through the fan out wires 40 or the array wiring area 50 into the GOA to perform drive control of the liquid crystal display panel.

In an embodiment, the first soldering pad 21 in the first flexible circuit board region 20 and the second soldering pad 31 in the second flexible circuit board region 30 are configured to bond with the flexible circuit board. The flexible circuit board performs corresponding signal transmission through the first soldering pad 21 and the second soldering pad 31.

With reference to FIG. 2, the at least one second sub-soldering pad 311 is electrically connected to the second input terminal port 112 of the drive IC chip region 10, and is electrically connected to a second output terminal port 122 corresponding to the second input terminal port 112 in the drive IC chip region 10 through the internal wires of the drive IC chip to output the second driving signals and perform drive control to the display panel.

In an embodiment, the flexible circuit board outputs second driving signals through the at least one second sub-soldering pad 311. The second driving signals pass through the second input terminal port 112 and enter the drive IC chip. Finally, the second driving signals are outputted out from the second output terminal port 122 through the internal wires of the drive IC chip, and are transmitted into the GOA through the fan out wires 40 or the array wiring area 50 to perform drive control to the liquid crystal display panel.

In an embodiment, a sum of the number of the at least one first input terminal port 111 and a number of the second input terminal port 112 is equal to or greater than a sum of the number of the at least one first sub-soldering pad 211 and a number of the at least one second sub-soldering pad 311. The at least one first input terminal port 111 not electrically connected to the at least one first sub-soldering pad 211, or the second input terminal port 112 not electrically connected to the at least one second sub-soldering pad 311, can be configured to output other signals.

In an embodiment, the second soldering pad 31 can be further configured to transmit testing signals to perform a test to the display panel. With reference to FIG. 2, the at least one second sub-soldering pad 311 can either serve as an input terminal end for the second driving signals of the flexible circuit board or serve as an input terminal end for testing signals. The at least one second sub-soldering pad 311 transmits corresponding testing signals, the testing signals are transmitted to the fan out wires 40 or the array wiring area 50 through the drive IC chip, and are finally transmitted to the array test region of the display panel to perform a test to the display panel.

Figure 3:
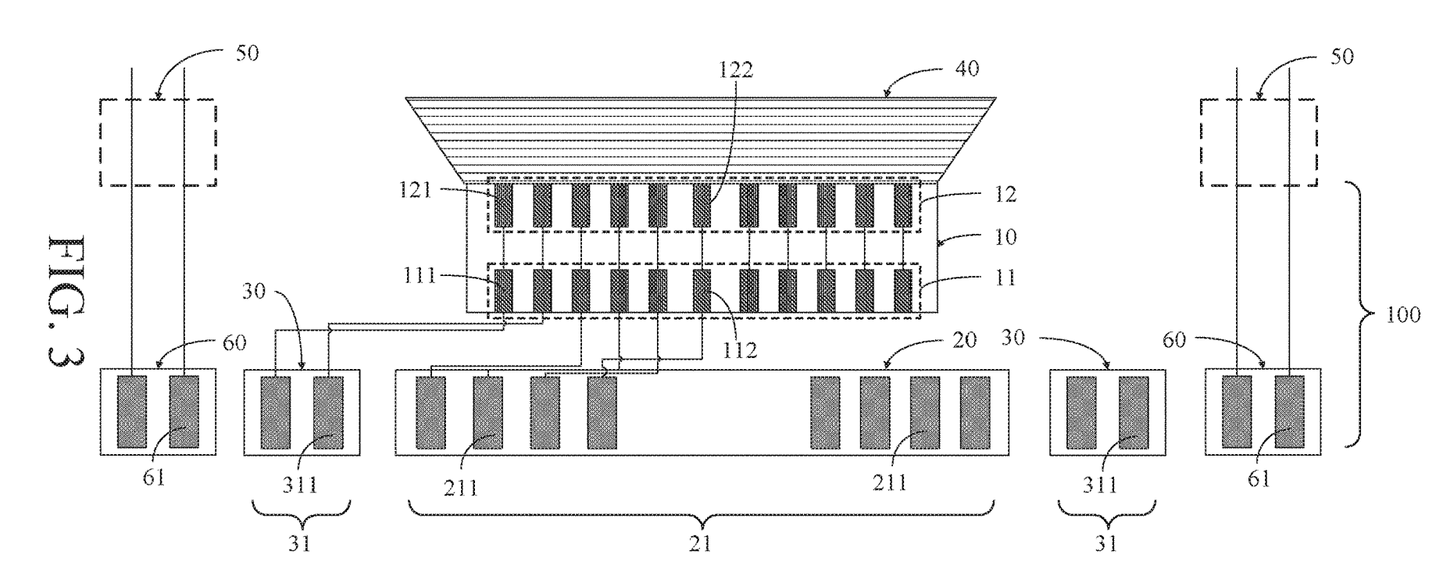
FIG. 3 is a schematic structural view of a third embodiment of the display panel of the present invention.

With reference to FIG. 3, FIG. 3 is a schematic structural view of a third embodiment of the display panel of the present invention.

Based on the first embodiment or the second embodiment, the display panel further includes liquid crystal cell test regions 60. The following description is presented based on the second embodiment.

The liquid crystal cell test regions 60 are located at two outer sides of the bonding region 100 respectively, and are located outside the second flexible circuit board region 30. The liquid crystal cell test region 60 are configured to transmit testing signals through test soldering pads of the liquid crystal cell test regions 60. The testing signals are configured to perform a test to the liquid crystal display panel.

In an embodiment, at least one test soldering pad 61 is disposed in each of the liquid crystal cell test regions 60. The at least one test soldering pad 61 is electrically connected to the array test region of the display panel through the array wiring area 50 to perform a test to the display panel.

Compared to the first embodiment or the second embodiment, although the present embodiment is disposed with the liquid crystal cell test regions 60, a width of each of the liquid crystal cell test regions 60 in the present embodiment is less than a width of the conventional liquid crystal cell test region. A number of the at least one test soldering pad 61 of each of the liquid crystal cell test regions 60 in the present embodiment is less than a number of the test soldering pads of the conventional liquid crystal cell test region.

In the conventional technology, it is assumed that a number M of first soldering pads are disposed in the first flexible circuit board region, an interval between adjacent two of the first soldering pads is L/M, L is a width of the first flexible circuit board. However, in the first embodiment and the second embodiment, a number N of the first soldering pads in the first flexible circuit board are disposed in a liquid crystal cell test region of the conventional display panel, i.e., the second soldering pad of the second flexible circuit board region in the first embodiment and the second embodiment.

Compared to the conventional technology, an interval of adjacent two of the first soldering pads of the first flexible circuit board region in the present invention is L/(M−N), which is greater than the interval of the adjacent two of the first soldering pads in the prior art. Therefore, transfer of some of the first soldering pads increases the interval of the adjacent two of the first soldering pads, decreases requirement to precision of alignment and connection between the flexible circuit board region and the flexible circuit board.

In third embodiment, because of disposing of the liquid crystal cell test region, a width of the second flexible circuit board region in the third embodiment is less than a width of the second flexible circuit board region in the first embodiment or the second embodiment. Although the interval between the adjacent two of the first soldering pad is increased and the requirement of precision of alignment and connection between the flexible circuit board region and the flexible circuit board, the improvement extent is less than that of the first embodiment and the second embodiment.

According to another aspect of the present invention also provides a display module. The display module includes the display panel, and further includes a touch layer, a polarizer and a cover plate layer sequentially disposed on the display panel.

According to still another aspect of the present invention, an electronic device is also provided, the electronic device includes the display module. The electronic device includes but is not limited to a cellular phone, a tablet, a computer display, a gaming device, a television, a display screen, a wearable device, and other living or home appliance with a display function.

Operation principle of the display module and operation principle of the electronic device are similar to operation principle of the display panel. Operation principle of the display module and operation principle of the electronic device can specifically refer to operation principle of the display panel and will not be described repeatedly herein.

The present invention provides a display panel and a display module. The display panel includes bonding region. The bonding region includes a drive IC chip region, a first flexible circuit board region and a second flexible circuit board region. A first soldering pad is disposed in the first flexible circuit board region. A second soldering pad is disposed in the second flexible circuit board region. The first soldering pad and the second soldering pad are configured to output driving signals. The present invention, by disposing the second flexible circuit board regions on sides of the first flexible circuit board region, decreases the number of the first soldering pads in the first flexible circuit board region, increases the interval of the adjacent first soldering pads, which certainly reduces requirement to connection between the flexible circuit board region and the flexible circuit board and raises quality of the display panel.

Although the preferred embodiments of the present invention have been disclosed as above, the aforementioned preferred embodiments are not used to limit the present invention. The person of ordinary skill in the art may make various changes and modifications without departing from the spirit and scope of the present invention. Therefore, the scope of protection of the present invention is defined by the scope of the claims.

What is claimed is:

1. A display panel, wherein the display panel comprises a bonding region, the bonding region comprises:
    a drive integrated circuit (IC) chip region, wherein a drive IC chip is disposed in the drive IC chip region of the display panel, and the drive IC chip region is configured to output driving signals;
    a first flexible circuit board region, wherein a first soldering pad is disposed in the first flexible circuit board region of the display panel, and the first soldering pad is electrically connected to an input terminal port of the drive IC chip region, and is electrically connected to a output terminal port of the drive IC chip region through internal wires of the drive IC chip to output first driving signals; and
    at least one second flexible circuit board region, wherein a second soldering pad is disposed in the second flexible circuit board region of the display panel, and the second soldering pad is configured to output second driving signals;
    wherein the at least one second flexible circuit board region are two second flexible circuit board regions; and
    wherein the drive IC chip region is parallel to the first flexible circuit board region, and the second flexible circuit board regions are located at two outer sides of the drive IC chip region and the first flexible circuit board region.

2. The display panel as claimed in claim 1, wherein the second soldering pad is further configured to transmit testing signals.

3. The display panel as claimed in claim 1, wherein the display panel further comprises an array wiring area, and the second soldering pad is electrically connected to signal wires in the array wiring area to output the second driving signals.

4. The display panel as claimed in claim 3, wherein
the drive IC chip region comprises at least one input terminal port, and the first soldering pad comprises at least one first sub-soldering pad; and
a number of the at least one input terminal port is equal to or greater than a number of the at least one first sub-soldering pad.

5. The display panel as claimed in claim 1, wherein the second soldering pad is electrically connected to the corresponding input terminal port of the drive IC chip region, and is electrically connected to the output terminal port of the drive IC chip region through the internal wires of the drive IC chip to output the second driving signals.

6. The display panel as claimed in claim 5, wherein
the drive IC chip region comprises at least one first input terminal port and at least one second input terminal port, the first soldering pad comprises at least one first sub-soldering pad, and the second soldering pad comprise at least one second sub-soldering pad;
the at least one first sub-soldering pad is electrically connected to the at least one first input terminal port of the drive IC chip region, and is electrically connected to a first output terminal port corresponding to the at least one first input terminal port in the drive IC chip region through the internal wires of the drive IC chip to output the first driving signals; and
the at least one second sub-soldering pad is electrically connected to the at least one second input terminal port of the drive IC chip region, and is electrically connected to a second output terminal port corresponding to the at least one second input terminal port in the drive IC chip region through the internal wires of the drive IC chip to output the second driving signals.

7. The display panel as claimed in claim 6, wherein a sum of a number of the at least one first input terminal port and a number of the at least one second input terminal port, is equal to or greater than a sum of a number of the at least one first sub-soldering pad and a number of the at least one second sub-soldering pad.

8. The display panel as claimed in claim 1, wherein the display panel further comprises a liquid crystal cell test region, the liquid crystal cell test region comprises at least one test soldering pad, and the at least one test soldering pad is configured to transmit testing signals.

9. A display module, the display module comprising a display panel, and further comprising a touch layer, a polarizer and a cover plate layer located on the display panel, wherein the display panel comprises a bonding region, the bonding region comprises:
a drive integrated circuit (IC) chip region, wherein a drive IC chip is disposed in the drive IC chip region of the display panel, and the drive IC chip region is configured to output driving signals;
a first flexible circuit board region, wherein a first soldering pad is disposed in the first flexible circuit board region of the display panel, and the first soldering pad is electrically connected to an input terminal port of the drive IC chip region, and is electrically connected to a corresponding output terminal port of the drive IC chip region through internal wires of the drive IC chip to output first driving signals; and
at least one second flexible circuit board region, wherein a second soldering pad is disposed in the second flexible circuit board region of the display panel, and the second soldering pad is configured to output second driving signals;
wherein the at least one second flexible circuit board region are two second flexible circuit board regions; and
wherein the drive IC chip region is parallel to the first flexible circuit board region, the second flexible circuit board regions are located at two outer sides of the drive IC chip region and the first flexible circuit board region.

10. The display module as claimed in claim 9, wherein the second soldering pad is further configured to transmit testing signals.

11. The display module as claimed in claim 9, wherein the display panel further comprises an array wiring area, and the second soldering pad is electrically connected to corresponding signal wires in the array wiring area to output the second driving signals.

12. The display module as claimed in claim 11, wherein
the drive IC chip region comprises at least one input terminal port, and the first soldering pad comprises at least one first sub-soldering pad; and
a number of the at least one input terminal port is equal to or greater than a number of the at least one first sub-soldering pad.

13. The display module as claimed in claim 9, wherein the second soldering pad is electrically connected to the corresponding input terminal port of the drive IC chip region, and is electrically connected to the corresponding output terminal port of the drive IC chip region through the internal wires of the drive IC chip to output the second driving signals.

14. The display module as claimed in claim 13, wherein
the drive IC chip region comprises at least one first input terminal port and at least one second input terminal port, the first soldering pad comprises at least one first sub-soldering pad, and the second soldering pad comprise at least one second sub-soldering pad;
the at least one first sub-soldering pad is electrically connected to the at least one first input terminal port of the drive IC chip region, and is electrically connected to a first output terminal port corresponding to the at least one first input terminal port in the drive IC chip region through the internal wires of the drive IC chip to output the first driving signals; and
the at least one second sub-soldering pad is electrically connected to the at least one second input terminal port of the drive IC chip region, and is electrically connected to a second output terminal port corresponding to the at least one second input terminal port in the drive IC chip region through the internal wires of the drive IC chip to output the second driving signals.

15. The display module as claimed in claim 14, wherein a sum of a number of the at least one first input terminal port and a number of the at least one second input terminal port, is equal to or greater than a sum of a number of the at least one first sub-soldering pad and a number of the at least one second sub-soldering pad.

16. The display module as claimed in claim 9, wherein the display panel further comprises a liquid crystal cell test region, the liquid crystal cell test region comprises at least one test soldering pad, and the at least one test soldering pad is configured to transmit testing signals.

* * * * *